(12) United States Patent
Derian et al.

(10) Patent No.: US 6,506,832 B1
(45) Date of Patent: *Jan. 14, 2003

(54) PROCESS FOR THE PREPARATION OF AQUEOUS EMULSIONS OF ADVANTAGEOUSLY MASKED (POLY) ISOCYANATE OILS AND/OR GUMS AND/OR RESINS AND EMULSIONS OBTAINED

(75) Inventors: Paul-Joel Derian, Fontenay-aux-Roses (FR); Bruno Langlois, Sainte-Geneviève-des-Bois (FR); Alain Senechal, Malson-Alfort (FR)

(73) Assignee: Rhone-Poulenc Chimie, Courbevoie Cedex (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/530,193

(22) PCT Filed: Mar. 30, 1994

(86) PCT No.: PCT/FR94/00353

§ 371 (c)(1),
(2), (4) Date: Mar. 4, 1996

(87) PCT Pub. No.: WO94/22935

PCT Pub. Date: Oct. 13, 1994

(30) Foreign Application Priority Data

Mar. 31, 1993 (FR) ............................................. 93 03796
Mar. 31, 1993 (FR) ............................................. 93 03795

(51) Int. Cl.$^7$ ................................................ C08G 18/80
(52) U.S. Cl. ..................... 524/589; 524/591; 252/182.2; 516/53; 528/45
(58) Field of Search ................................ 524/589, 591; 528/45; 252/182.2; 516/53

(56) References Cited

U.S. PATENT DOCUMENTS 3,519,478 A * 7/1970 Howell ....................... 524/591
3,669,911 A * 6/1972 Najvar
4,663,377 A * 5/1987 Hombach et al.

FOREIGN PATENT DOCUMENTS

| DE | 3807555 | * | 9/1988 |
| EP | 0122552 | * | 10/1984 |
| EP | 0276465 | * | 8/1988 |
| EP | 0464781 | * | 1/1992 |
| EP | 0524511 | * | 1/1993 |
| EP | 0524518 | * | 1/1993 |
| JP | 3064309 | * | 3/1991 |

* cited by examiner

*Primary Examiner*—Rachel Gorr
(74) *Attorney, Agent, or Firm*—Burns, Doane, Swecker & Mathis, L.L.P.

(57) ABSTRACT

The present invention provides stable, high solids, aqueous emulsions of high viscosity masked (poly)isocyanates, water, surface active agents, and, optionally, thickening water-soluble polymers. The emulsions of the present invention are formulated in as little as 20 parts by weight water or less. The present invention further provides processes for forming such emulsions.

23 Claims, No Drawings

PROCESS FOR THE PREPARATION OF AQUEOUS EMULSIONS OF ADVANTAGEOUSLY MASKED (POLY) ISOCYANATE OILS AND/OR GUMS AND/OR RESINS AND EMULSIONS OBTAINED

The present invention relates to a process for the preparation of emulsions of oils and/or gums and/or resins, which are preferably viscous. Its subject is more particularly a process for emulsifying (poly)isocyanates.

Furthermore, diisocyanates, especially alkylene diisocyanates (tolonates) and their derivatives of biuret type or their trimers are widely employed in the activity of paints and varnishes.

However, among the problems which remain unsolved to date, there is one that is particularly acute, namely the use of large quantity of organic solvent, the presence of which is considered to be toxic and detrimental to the environment.

This is why one of the aims of the present invention is to provide a process which makes it possible to obtain a stable dispersion of (poly)isocyanates in water.

Another aim of the present invention is to provide a monomer which permits (poly)isocyanate formulations in aqueous phase, with a view to responding to the progress in the techniques and regulations which tend to make the organic solvents disappear.

In order to solve this problem, there is already a description of the preparation of aqueous emulsions of oils, especially of high viscosity, by separate introduction in two different steps of two types of amphiphilic surface-active agents (which have different "HLB" values when this scale can be employed) into a conventional mixing apparatus.

However, these techniques are expensive in respect of energies and difficult to use. They demand mixing devices capable of giving high shears.

This is why one of the aims of the present invention is to provide a process which makes it possible to employ equipment which does not give high shears.

Another aim of the present invention is to provide a process which avoids high consumptions of energies.

Another aim of the present invention is to provide a process which makes it possible to obtain a narrow particle size distribution of particularly fine droplets.

We disclose a process for the preparation of aqueous emulsions of viscous phases based on preferably viscous, advantageously masked (poly)isocyanate oils and/or gums and/or resins, using a conventional mixing apparatus and not requiring the obligatory use of two types of surface-active agents.

Such a process makes it possible to prepare emulsions of advantageously masked (poly)isocyanate oils and/or gums and/or resins of completely controlled and relatively homogeneous particle size.

The process forming the subject of the invention is characterized in that a mixture consisting of the following is blended 100 parts by weight of an advantageously masked (poly) isocyanate(s) phase (A) of dynamic viscosity at 25° C. which is at least equal to 3 Pa s, preferably at least equal to 30 Pa s, or of consistency at 25° C. which does not exceed 2000, advantageously masked (poly)isocyanate (s) phase including at least one oil and/or at least one gum and/or at least one resin:

2 to 20 parts by weight, preferably from 3 to 15 parts by weight of water;

2 to 20 parts by weight, preferably from 3 to 15 parts by weight of at one least surface-active agent (B) or a combination of 0.5 to 10 parts by weight, preferably of 1 to 10 parts by weight of at least one surface-active agent (B) and of $2.5 \times 10^{-4}$ to 20 parts by weight, preferably of 0.001 to 15 parts by weight of at least one thickening water-soluble polymer (C) of molecular mass higher than 10,000 g/mole, preferably higher than 100,000 g/mole, the said surface-active agent or mixture of surface-active agents exhibiting an ELB of at least 10 and the relative quantities of water and of constituent(s) (B) and optionally (C) being such that the viscosity or the consistency of the mixture of water+surface-active agent(s)+optional thickening water-soluble polymer(s) is close to or higher than one tenth of the viscosity or consistency of the advantageously masked (poly)isocyanate(s) phase (A), preferably close to or higher than the viscosity or consistency of the advantageously masked (poly)isocyanate(s) phase (A);

the said blending being carried out over a period and in shearing conditions which are sufficient to obtain an emulsion of "oil-in-water" type of particle size of the order of 0.1 to 5 micrometres, preferably of the order of 0.2 to 3 micrometres;

in that the mixture is then optionally diluted with water as a function of the desired solids content.

According to the invention a small scatter is obtained with a $d_{90}-d_{10}$ which is at most equal to 4, more generally to 1.5 micrometres, preferably to 1 micrometre.

For a good implementation of the invention the dynamic viscosity measurements are preferably carried out at 25° C. with the aid of a Brookfield viscometer according to AFNOR standard NFT 76 102 of February 1972; the determination of the consistency may be performed by measuring the penetrability with the aid of a penetrometer, for example according to one of the standards AFNOR NFT 60 119, NFT 60 123, NFT 66 004, ASTM D 217, D 937, D 1321 and D 5.

As examples of advantageously masked (poly)isocyanate (s) (A) which can be used there may be mentioned-those consisting of:

polymethylene diisocyanates (generally ω,ω'), it being possible for the chain sequencing of the methylenes to be interrupted by an aromatic nucleus or by an oxygen, the compounds originating from these derivatives to obtain a biuret, a dimer or a trimer.

it is appropriate to cite the prepolymer(s) of these products, which are formed by the reaction of isocyanate functional group(s) with a diol in proportions which define the number of the prepolycondensate units and ensures that virtually all of the end functional groups are isocyanates.

It is also possible to cite the compounds of addition of the above derivatives to polyols which have at least 3 alcohol functional groups.

The isocyanate functional groups are advantageously masked (this term is preferable to that of "blocked", frequently employed in texts of Anglo-American sources or those culturally adapted thereto), and, thus, for two reasons, the isocyanate functional group has actually reacted so that it is no longer at all isocyanate and when they are "released" there is no certainty in any case that one passes through an isocyanate intermediate, secondly this masking is not absolute since properties similar to the isocyanate are gradually encountered again at certain temperature).

According to one of the most surprising methods of the present invention, it has been possible to demonstrate that the emulsion technique employed makes it possible to obtain stable emulsions of unmasked (poly)isocyanate(s).

The relative chemical instability of the isocyanates in the presence of phases containing water molecules not only has not prevented the formation of the emulsion whose physical stability is remarkable, but also appears to have been significantly reduced by the emulsification. It appears, to an extent which depends especially on the dilution, on the surface-active agents and on the emulsifiers, that the emulsion technique protects the (poly)isocyanates for a while from chemical decomposition.

Thus the advantageously masked (poly)isocyanate(s) may advantageously correspond to the following formula:

A(-NCOblock)$_p$ (Formula I)

where A denotes an organic backbone which has n free valencies, p being between 2 and 7 (closed interval) advantageously between 2 and 4 (closed interval);

where NCOblock denotes an isocyanate functional group which is advantageously masked (or protected) or otherwise.

It is appropriate to mention that the total number of carbons of the said monomer is advantageously between 10 and 100, preferably between 20 and 100, more preferably between 25 and 75.

The backbone A may be made up from a heavy polyamine (including anilines) which, for example, has a carbon number equal to at least 6 advantageously to 10, preferably to 15 [which is converted into isocyanate by the action of phosgene in a manner which is per se known].

The backbone A may also be that of the trimers and of the biurets.

Among the masking groups it is possible to choose groups containing mobile hydrogen whose pKa is at most equal to 14, advantageously to 12 preferably to 10 more preferably 8.

The higher the pKa, the more it is desirable that the masking agent should be volatile.

The masking agents are chosen so that the emulsion should be stable at its storage temperature.

Among the chemical functional groups capable of masking isocyanates, the following functional groups may be mentioned by way of examples, or rather of paradigm:
    alcohols and thiols
    oximes
    hydroxylamines
    acids
    amides and imides
    betadiketones
    pyrazoles The advantageously masked (poly)isocyanate(s) phase (A) may advantageously be chosen from the phases of the list hereinafter:
    An oil and/or a gum and/or a resin containing a (poly) isocyanate group of viscosity of at least 3 Pa s, preferably of the order of 30 to 2,500 Pa s. Or of consistency of the order of 200 to 2,000.
    A mixture of oil(s) and/or gum(s) and/or resin(s) containing a (poly)isocyanate group, mixture of viscosity at least equal to 3 Pa s, preferably of the order of 30 to 2,500 Pa s. Or of consistency of the order of 200 to 2,000.
    A mixture of oil(s) and/or gum(s) and/or resin(s) containing advantageously masked (poly)isocyanate groups and of at least one solvent (or diluent) for the said oil and/or gum and/or resin, mixture of viscosity at least equal to 3 Pa s, preferably of the order of 30 to 2,500 Pa s. Or of consistency of the order of 200 to 2,000.

The surface-active agents (B) used may be nonionic of HLB higher than 10, preferably of the order of 10 to 20, anionic, cationic, zwitterionic or amphoteric of HLB higher than 10.

The nonionic surface-active agents may be chosen from alkoxylated fatty acids, polyalkoxylated alkylphenols, polyalkoxylated fatty alcohols, polyalkoxylated or polyglycerolated fatty amides, polyglycerolated alcohols and alphadiols, ethylene oxide-propylene oxide block polymers etc., as well as alkylglucosides, alkylpolyglucosides, sugar ethers, sugar esters, sugar glycerides, sorbitan esters, etc., and the ethoxylated compounds of these sugar derivatives exhibiting an HLB of at least 10.

The anionic surface-active agents may be chosen from alkali metal alkylbenzenesulphonates, monoalkyl sulphates, alkyl ether sulphates, alkylaryl ether sulphates, dialkylsulphosuccinates, alkyl phosphates, ether phosphates, etc., exhibiting an HLB of at least 10.

Among the cationic surface-active agents there may be mentioned aliphatic or aromatic fatty amines, aliphatic fatty amides, quaternary a monium derivatives, etc. exhibiting an HLB of at least 10.

Among the zwitterionic or amphoteric surface-active agents there may be mentioned betaines and their derivatives, sultaines and their derivatives, lecithins, imidazoline derivatives, glycinates and their derivatives, amidopropionates, fatty amine oxides, etc. exhibiting an ELB of at least 10.

The thickening polymers (C) are soluble in water to at least 50%; examples of thickening polymers. which may be mentioned are:
    Those obtained by chemical synthesis, such as polyvinyl alcohols, polyethylene glycols, polyvinylpyrrolidones, alkali metal polyacrylates etc.
    Those extracted from plants and optionally modified, such as carrageenates, alginates, methyl celluloses, hydroxypropyl celluloses, hydroxyethyl celluloses etc.

The relative quantities of water, of surface-active agent(s) and of optional thickening polymer(s) are functions of the viscosity of the advantageously masked (poly)isocyanate(s) phase including at least one oil and/or one gum and/or one resin containing a (poly)isocyanate group and of the nature of the (mixture of) surfactant(s) and of the nature of the (mixture of) optional thickening polymer(s).

In the absence of thickening polymer the weight ratio of water/water+surface-active agent(s) is, for example, of the order of 20/100 to 70/100, preferably of the order 25/100 to 60/100 so as to stabilize an emulsion of an advantageously masked (poly)isocyanate(s) phase consisting of an oil containing a (poly)isocyanate group of viscosity of the order of 30 Pa s to 500 Pa s, with the aid of a nonylphenol which has 9 or 10 ethoxy units as the only surface-active agent.

The use of an aqueous phase consisting of water and sodium dodecyl sulphate as the only surface-active agent, in a weight ratio of water/water+surface-active agent of 5/7 and containing from 0.5 to 2% of its weight of hydroxyethyl cellulose as thickening polymer, allows the stabilization of oils of viscosity of the order of 5 Pa s TO 30 Pa s.

It is preferable, above all when the isocyanates are not masked, to choose thickening agents and surfactants which are substantially inert towards the isocyanate functional groups under the conditions of manufacture of the emulsion, especially at the temperature at which the emulsion is made, and in the storage conditions.

The operation of emulsifying the advantageously masked (poly)isocyanate(s) phase may be carried out:
    by the introduction of at least one oil and/or one gum and/or at least one resin+optional solvent(s)+optional (poly)isocyanate into a mixture of water+surface-active agent(s)+optional water-soluble polymer(s), the optional filler(s) being present in the aqueous mixture and/or introduced into the said mixture, and then blending at a temperature of the order of 10 to 50° C. in mixers of the extruder type with single or multiple screw(s), turbine planet wheel mixers, static mixers, blade, screw and arm mixers;

or, preferably, by introduction of water into an oil(s) and/or gum(s) and/or resin(s) present in totality or partially [for example 50–90% of the total quantity of oil(s) and/or gum(s) and/or resin(s)]+optional solvent (s)+optional filler(s)+surface-active agent(s)+optional water-soluble polymer(s) mixture, then blending at a temperature of the order of 10 to 50° C. in mixers of the extruder type with single or multiple screw(s), turbine planet wheel mixers, static mixers, blade, screw and arm mixers etc. The optionally remaining quantity of oil(s) and/or gum(s) and/or resin(s) being introduced into the mixture after the formation of the "oil-in-water" emulsion while the blending is maintained.

One of the advantages of the present invention lies in the use of equipment developing relatively low shears, in general at least equal to $10^2$ but advantageously at most equal to $10^5$ preferably to $10^4$, more preferably around $10^3$. These reference measurements are carried out in continuous pure water phase.

The emulsions of advantageously masked (poly) isocyanate oils and/or gums and/or resins obtained according to the process of the invention are particularly stable in storage; they can be very fine and monodisperse; their solids content may range from 25 (or less, depending on the intended application of the said emulsions) to 98%, it being possible for the adjustment of the solids content to be carried out by dilution.

It is possible to obtain emulsions with organic diluent contents which are as varied as possible; it is thus possible to obtain emulsions containing no organic diluents.

When it is desired to emulsify an unmasked tolonate, it is preferable that the solids content should be as high as possible in general at least higher than 3/4 advantageously than 9/10 preferably than 19/20.

According to the invention it is possible to obtain such emulsions either directly, for example at higher temperature, or by producing an emulsion with organic diluent, an emulsion which will be subsequently treated to evaporate the said organic diluents.

It is obvious that the organic diluents will have been chosen so that they are easily capable of being evaporated in presence of water.

These emulsions may be employed for the preparation of (poly)isocyanate-based compositions in virtually all their uses, etc.

The invention is also aimed at an emulsion of mixtures of the (poly)isocyanate(s) with the compounds which must be polycondensed with it, this being especially when the (poly) isocyanate(s) are masked.

In particular, these emulsions may be useful for, and usable in, paints.

The composition of the paints may also include a coloured base. Consisting of a pigment and of titanium oxide.

The aqueous phase advantageously contains soluble oligo- or poly-mers of polyol or polyol(poly)amine condensate or polyester-polyol type in sufficient quantity to permit the final polycondensation.

Either the condensation reactant(s) is liposoluble and in this case the emulsion is produced by introducing the said reactant(s) into the (poly)isocyanates phase (noncontinuous phase) or by emulsifying them separately and mixing the various emulsions in which the continuous phase is the aqueous phase; or the reactant(s) are water-soluble and can, with appropriate surface-active agents, be used as agent for diluting the aqueous phase (continuous phase).

These are the polyols usually employed during condensations with the common isocyanates.

Among the polyols it is possible especially to employ those which are mentioned in European Patent Application published under No. 0358979, especially when the isocyanates are not masked.

When the (poly)isocyanate(s) are masked, either phase may contain a "demasking" catalyst in an appropriate form which is known per se. Thus, according to an embodiment of the invention the composition additionally comprises a catalyst for deblocking the isocyanate functional groups. (cf. Journal of Applied Polymer Science "Catalysis of the Isocyanate—Hydroxyl Reaction" vol. IV, issue No. 11, p. 207, (1960), J. W. Britain).

These catalysts are known in themselves and are advantageously chosen from those which induce a temperature of release of the isocyanate functional groups which is at most equal to the usual temperature of the final operations of setting of the varnish or of the paint or of equivalents.

The release temperature induced by the catalysts is advantageously at least equal to approximately 100° C.

It is appropriate to point out that the protecting groups are released more easily if the nitrogen of the protected isocyanate functional group is bonded to an unsaturated, especially aromatic, carbon, which may sometimes be a drawbacks.

In the coating application it is preferable that the nitrogen of the protected isocyanate functional group should be bonded to a saturated carbon ($sp^3$ hybridization). In the case where the isocyanates are not masked;[sic] such isocyanates bonded to a saturated carbon ($sp^3$ hybridization) resist hydrolysis well especially in the case where the said carbon is secondary and preferably tertiary.

The backbone A may also be that of the trimers and of the biurets.

The mean size of the droplets is advantageously between 0.01 $\mu$m and 20 $\mu$m, preferably between 0.1 $\mu$m and 10 $\mu$m.

The examples are given by way of indication and cannot be considered as a limit of the field and of the spirit of the invention.

Definition

The Tolonate employed here is the product of the trimerization of hexamethylene diisocyanate

[Lacuna]

The tolonate D2 is the product of the trimerization of hexamethylene diisocyanate advantageously masked with methyl ethyl ketoxime and diluted with an aromatic petroleum fraction [Solvesso 100 (registered trademark)] until the latter reaches 25% by volume.

EXAMPLE 1

The following are introduced into a closed 250-cm$^3$ reactor fitted with a scraper blade stirring system (IKA model (registered trademark):

2.5 g of Antarox 461 P (registered trademark)

2.5 g of water

The mixture is stirred at 150 revolutions/min$^{-1}$ for 5 minutes. A thick paste is formed, with a dynamic viscosity of 780 Pa s at a 1 s$^{-1}$ shear rate. 85 g of Tolonate D2 (registered trademark), of 4.2 Pa s dynamic viscosity at a shear rate of 1$^{-1}$ are added over approximately 20 minutes, with constant stirring at approximately 350 revolutions/min$^{-1}$.

At the end of the addition of the Tolonate D2 (registered trademark) the mixture is blended with the same stirring so as to reach a limiting particle size.

10 g of water are added.

The emulsion obtained has a solids content of 87.5% and a particle size, measured with the Sympatec (registered trademark) laser particle size analyser, of 0.6 μm with a $d_{90}$–$d_{10}$ size distribution equal to 0.70 μm.

EXAMPLE 2

The operation described above is repeated with, on the one hand:

0.7 g of Antarox 461 P (registered trademark)
0.9 g of water and, on the other hand, 15 g of methyl ketoxime-blocked Tolonate (registered trademark) at a concentration of 15% in Solvesso. This isocyanate has a dynamic viscosity of 57 Pa s at a shear rate of 1 s$^{-1}$. At the end of the addition of the Tolonate (registered trademark) the emulsion is stirred for about ten minutes and then diluted with water to have a Tolonate (registered trademark) solids content of 70%. The final emulsion has a particle size, measured with the Sympatec (registered trademark) laser particle size analyser, of 1.1 μm with a $d_{90}$–$d_{10}$ size distribution equal to 1.2 μm.

EXAMPLE 3

The operation described in Example 1 is repeated with, on the one hand, the same surface agents and, on the other hand, the ε-caprolactam-blocked Tolonate (registered trademark) at a concentration of 25% in RPDE of dynamic viscosity 7.2 Pa s at a shear rate of 1 s$^{-1}$.

The emulsion is kept stirred for about fifteen minutes at 350 revolutions/min$^{-1}$ to have a mean particle size, measured with Sympatec (registered trademark) laser particle size analyser, of 0.55 μm with a $d_{90}$–$d_{10}$ size distribution equal to 0.75 μm.

EXAMPLE 4

The operation described in Example 1 is repeated with, on the one hand, the same surface agents and, on the other hand, a mixture of hydoxylated polyester resin Desmophen 690 (registered trademark) and of Tolonate D2 (registered trademark) in the mass ratio of 1:1 which has a 21 Pa s dynamic viscosity at a shear rate of 1 s$^{-1}$.

The emulsion is kept stirred for about fifteen minutes at 300 revolutions/min$^{-1}$ to have a mean particle size, measured with the Sympatec (registered trademark) laser particle size analyser, of 1.1 μm with a $d_{90}$–$d_{10}$ size distribution equal to 1.4 μm.

The final emulsion is diluted with water to have a solids content of 85%.

EXAMPLE 5

The following are introduced into a closed 250 cm$^3$ reactor fitted with a scraper blade stirring system:

2.0 g of TTAB, cationic surfactant
3.0 g of water

The mixture is stirred at 150 revolutions/min$^{-1}$ [sic] for 5 minutes. A thick paste is formed, with a dynamic viscosity of 86 Pa s at a 1 s$^{-1}$ shear rate.

80 g of Tolonate D2a (registered trademark), of 5 Pa s dynamic viscosity at a shear rate of 1 s$^{-1}$, are added over approximately 120 minutes with continuous stirring at approximately 350 revolutions/min$^{-1}$. The particle size of the emulsion is measured for each addition of 10 g. The polydispersity of the emulsion is followed so as to obtain a D90–D10 [sic] size distribution close to 0.5 (curve).

At the end of the addition of the Tolonate D2a (registered trademark) 10 g of water are added.

The emulsion obtained has a solids content of 82% and a particle size, measured with the Sympatec (registered trademark) laser particle size analyser, of 0.75 μm with a $d_{90-d10}$ size distribution equal to 0.95 μm.

EXAMPLE 6

The following are introduced into a 200-cm$^3$ beaker with continuous stirring at 300 revolution/min$^{-1}$:

4.0 g of sodium dodecyl sulphate, anionic surfactant
4.0 of water.

A thick paste is formed, with a dynamic viscosity of 93 Pa s at a 1 s$^{-1}$ shear rate, to which 91.5 g of Tolonate D2 (registered trademark) and 2 g of water are added slowly with the same stirring.

After addition, the stirring is continued for 10 minutes while the proportions of the various constituents are kept constant.

The concentrated emulsion is diluted by addition of water, still with the same stirring for 5 minutes. The final emulsion has the following composition: 73% of Tolonate D2 (registered trademark), 3.2% of sodium sulphate dodecyl and 23.8% of water and a particle size, measured with the Sympatec (registered trademark) laser particle size analyser, of 0.97 μm with a $d_{90}$–$d_{10}$ size distribution equal to 1.45 μm.

EXAMPLE 7

The following are introduced into a closed 250-cm$^3$ reactor fitted with a scraper blade stirring system (IKA model (registered trademark):

2.0 g of TTAB cationic surfactant
3.0 g of water

The mixture is stirred at 150 revolutions/min$^{-1}$ for 5 minutes. A thick paste is formed, with a dynamic viscosity of 86 Pa s at a 1 s$^{-1}$ shear rate. 85 g of unmasked Tolonate HDT (registered trademark) are added over approximately 20 minutes with continuous stirring at approximately 350 revolutions/min$^{-1}$.

At the end of the addition of the Tolonate D2 (registered trademark), the mixture is blended with the same stirring so as to reach a limiting particle size.

30 g of water are added.

The emulsion obtained has a solids content of 87.5% and a particle size, measured with the Sympatec (registered trademark) laser particle size analyser, of 0.8 μm with a $d_{90}$–$d_{10}$ size distribution equal to 1 μm.

What is claimed is:

1. A process for the preparation of aqueous emulsions of (poly)isocyanate comprising blending a mixture of:
   a. 100 parts by weight of a (poly)isocyanate (A) having a dynamic viscosity of at least about 3 Pa s at 25° C.;
   b. 2 to 20 parts by weight of water; and
   c. 3 to 20 parts by weight of a surface-active agent (B);
   wherein said surface-active agent exhibits an HLB of at least 10 and the relative quantities of water and constituent (B) being such that the viscosity of the mixture of water and surface-active agent (B) is at least about one tenth of the viscosity of the (poly)isocyanate (A);
   and wherein said blending is carried out over a period and in shear conditions sufficient to obtain an oil-in-water emulsion with a particle size of about 0.1 to 5 micrometers.

2. The process of claim 1, wherein the (poly)isocyanate (A) has a dynamic viscosity of about 30 to 2,500 Pa s at 25° C.

3. The process of claim 1, wherein the (poly)isocyanate is a masked (poly)isocyanate.

4. The process of claim 3, wherein the masked (poly)isocyanate is masked with a functional group selected from the group consisting of alcohols, thiols, oximes, hydroxylamines, acids, amides, imides, beta diketones, and pyrazoles.

5. The process of claim 3, wherein the (poly)isocyanate (A) is in the form of an oil, gum, resin, or combination thereof.

6. The process of claim 1, wherein the surface-active agent (B) is nonionic, anionic, cationic, zwitterionic, or amphoteric and has an HLB greater than 10.

7. The process of claim 3, wherein the resulting emulsion has a solids content of from about 25% to 98%.

8. The process of claim 1, further comprising reducing the solids content of the resulting emulsion by further dilution with water.

9. The process according to claim 1, wherein the blending is carried out by introducing a (poly)isocyanate in the form of an oil, gum or resin into a mixture of water and surface-active agent, and then blending at a temperature of about 10 to 50° C. in a mixer.

10. The process of claim 9, wherein the mixer employed is selected from the group consisting of extruders with single or multiple screws, turbine planet wheel mixers, static mixers, blade mixers, screw mixers and arm mixers.

11. A process for the preparation of aqueous emulsions of (poly)isocyanate comprising blending a mixture of:
   a. 100 parts by weight of a (poly)isocyanate (A) having a dynamic viscosity of at least about 3 Pa s at 25° C.;
   b. 2 to 20 parts by weight of water;
   c. 0.5 to 10 parts by weight of a surface-active agent (B); and
   d. $2.5 \times 10^{-4}$ to 20 parts by weight of a thickening water-soluble polymer (C) of molecular mass greater than 10,000 g/mole;
   wherein said surface-active agent exhibits an HLB of at least 10 and the relative quantities of water and constituents (B) and (C) being such that the viscosity of the mixture of water and constituents (B) and (C) is at least one tenth the viscosity of the (poly)isocyanate (A);
   and wherein said blending is carried out over a period and in shear conditions sufficient to obtain an oil-in-water emulsion with a particle size of about 0.1 to 5 micrometers.

12. The process of claim 11, wherein the (poly)isocyanate (A) has a dynamic viscosity of about 30 to 2,500 Pa s at 25° C.

13. The process of claim 11, wherein the (poly)isocyanate is a masked (poly)isocyanate.

14. The process of claim 13, wherein the masked (poly)isocyanate is masked with a functional group selected from the group consisting of alcohols, thiols, oximes, hydroxylamines, acids, amides, imides, beta diketones, and pyrazoles.

15. The process of claim 11, wherein the (poly)isocyanate (A) is in the form of an oil, gum, resin, or combination thereof.

16. The process of claim 11, wherein the surface-active agent (B) is nonionic, anionic, cationic, zwitterionic, or amphoteric and has an HLB greater than 10.

17. The process of claim 11, wherein the thickening water-soluble polymers (C) are soluble to at least 50% (by weight) in water and are selected from the group consisting of polyvinyl alcohols, polyethylene glycols, polyvinylpyrrolidones, alkali metal polyacrylates, carrageenans, alginates, methyl celluloses, hydroxypropyl celluloses, and hydroxyethyl celluloses.

18. The process of claim 11, wherein the resulting emulsion has a solids content of from about 25% to 98%.

19. The process of claim 11, further comprising reducing the solids content of the resulting emulsion by further dilution with water.

20. The process of claim 11, wherein the blending is carried out by introducing a (poly)isocyanate in the form of an oil, gum or resin into a mixture of water, surface-active agent and water-soluble polymer, and then blending at a temperature of about 10 to 50° C. in a mixer.

21. The process of claim 20, wherein the mixer employed is selected from the group consisting of extruders with single or multiple screws, turbine planet wheel mixers, static mixers, blade mixers, screw mixers and arm mixers.

22. The process of claim 1, wherein the (poly)isocyanate (A) has at least one isocyanate functional group in which the nitrogen is bonded to a saturated carbon.

23. The process of claim 11, wherein the (poly)isocyanate (A) has at least one isocyanate functional group in which the nitrogen is bonded to a saturated carbon.

* * * * *